(12) United States Patent
Matze

(10) Patent No.: US 8,127,109 B2
(45) Date of Patent: Feb. 28, 2012

(54) VIRTUAL BLOCK DEVICE

(75) Inventor: John Edward Gerard Matze, Poway, CA (US)

(73) Assignee: Exar Corporation

( * ) Notice: Subject to any disclaimer, the term of this patent is extended or adjusted under 35 U.S.C. 154(b) by 0 days.

(21) Appl. No.: 12/940,400

(22) Filed: Nov. 5, 2010

(65) Prior Publication Data

US 2011/0276543 A1   Nov. 10, 2011

Related U.S. Application Data

(63) Continuation of application No. 12/414,538, filed on Mar. 30, 2009.

(51) Int. Cl.
*G06F 12/00* (2006.01)
(52) U.S. Cl. .. 711/216; 711/112; 711/115; 711/E12.001
(58) Field of Classification Search ............... 711/216, 711/112, 115, E12.001
See application file for complete search history.

(56) References Cited

U.S. PATENT DOCUMENTS

2008/0098083 A1  4/2008  Shergill et al.
2008/0294696 A1  11/2008  Frandzel

OTHER PUBLICATIONS

International Searching Authority "International Search Report and Written Opinion" for PCT/US2010/029270, May 24, 2010, 7 pages.
"Storport in Windows Server™ 2003: Improving Manageability and Performance in Hardware RAID and Storage Area Networks," Microsoft Corporation, Dec. 2003, 19 pages.

*Primary Examiner* — Yong Choe
(74) *Attorney, Agent, or Firm* — Fliesler Meyer LLP

(57) ABSTRACT

A virtual block device is an interface with applications that appears to the applications as a memory device, such as a standard block device. The virtual block device interacts with additional elements to do data deduplication to files at the block level such that one or more files accessed using the virtual block device have at least one block which is shared by the one or more files.

23 Claims, 9 Drawing Sheets

300. A block of data is sent to the hash processor on the card.

Example: "The quick brown fox jumps over the lazy dog's back."

302. A 160-bit hash is generated from the block by the hash processor on the card.

SHA-I hash of example = c45dbdb62478604a9eee03530b1452353c192b1

304. A "truncated hash" is extracted from the full hash.

In the example, the truncated hash is the first 26 bits of the full hash value of a block returned from the hash processor.

1100 0100 0101 1101 1011 1101 10   Truncated hash in binary (26 bits in length)
31176f6   Truncated hash in hexadecimal 306. The contents of the truncated hash array at the specified location are interrogated.

308. The array contents in this example (-1) indicate that the truncated hash value has not been processed prior to this occurence OR the full hash (and its corresponding data block) have been deleted or over written.

| Hash Array Index | Hash Array Contents |
|---|---|
| • | |
| • | |
| • | |
| 31176f3 | -1 (no match previously processed) |
| 31176f4 | -1 (no match previously processed) |
| 31176f5 | LBA and sub block address of full hash value and corresponding data |
| 31176f6 | -1 (no match previously processed) |
| 31176f7 | LBA and sub block address of full hash value and corresponding data |
| 31176f8 | LBA and sub block address of full hash value and corresponding data |
| • | |
| • | |
| • | |

*FIG. 3A*

310. The "Free Sub Block" list is interrogated to obtain an appropriately-sized Extent and Sub-Block allocation for the combination of the full hash and the compressed block.

| Extent | Available Sub-Blocks | | | |
|---|---|---|---|---|
| | 8K | 16K | 24K | 32K |
| x | 1 | 5 | 9 | D |
| | 2 | 6 | A | E |
| | 3 | 7 | B | F |
| | 4 | 8 | C | |

312. A new entry is made into the assigned Extent Sub-Block. The Extent Metadata is updated. The truncated hash array is updated with the address where the full hash and the contents of the compressed block are located.

| Extent "x" | System Extent Metadata |
|---|---|
| | • |
| | • |
| | • |
| A | c45dbdb62478604a9eee03530b1452353c192b1 [Full data block in compressed form] |
| | • |
| | • |
| | • |

*FIG. 3B*

400. A block of data is sent to the hash processor on the card.

Example: "The quick brown fox jumps over the lazy dog's back."

402. A 160-bit hash is generated from the block by the hash processor on the card.

SHA-1 hash of example = c45dbdb62478604a9eee03530b1452353c192b1

404. A "truncated hash" is extracted from the full hash.

In the example, the truncated hash is the first 26 bits of the full hash value of a block returned from the hash processor.

1100 0100 0101 1101 1011 1101 10  Truncated hash in binary (26 bits in length)
                       3117 6f6   Truncated hash in hexadecimal 406. The contents of the truncated hash array at the specified location are interrogated.

| Hash Array Index | Hash Array Contents |
|---|---|
| • | |
| • | |
| • | |
| 31176f3 | -1 (no match previously processed) |
| 31176f4 | -1 (no match previously processed) |
| 31176f5 | LBA and sub block address of full hash value and corresponding data |
| 31176f6 | LBA and sub block address of full hash value and corresponding data |
| 31176f7 | LBA and sub block address of full hash value and corresponding data |
| 31176f8 | LBA and sub block address of full hash value and corresponding data |
| • | |
| • | |
| • | |

408. The array contents in this example indicate that the truncated hash value has processed previously.

*FIG. 4A*

410. The Extent Sub Block is interrogated. If the full hash values match, this is a duplicate block. The Metadata Counter is incremented.

| Extent "x" | System Extent Metadata |
|---|---|
|  | • |
|  | • |
|  | • |
| A | c45dbdb62478604a9eee03530b1452353c192b1 [Full data block in compressed form] |
|  | • |
|  | • |
|  | • |

412. If the full hash values do not match, a pointer in the Extent sub-block directs the system to interrogate the next hash candidate. This process continues until: a) a match is found or b) the last candidate entry has been interrogated. If no match on the full hash value is found, this hash is new and new entry processing continues. If the full hash values match, this is a duplicate block. The Metadata Counter is updated.

| Extent "x" | System Extent Metadata |
|---|---|
|  | • |
|  | • |
|  | • |
|  | c45dbdb62478604a9eee03530b1452353c192d2 [Full data block in compressed form] [Pointer to next candidate Extent Sub-Block] |
|  | • |
|  | • |
|  | • |

| Extent "x" | System Extent Metadata |
|---|---|
|  | • |
|  | • |
|  | • |
|  | c45dbdb62478604a9eee03530b1452353c192b1 [Full data block in compressed form] [Pointer to next candidate Extent Sub-Block] |
|  | • |
|  | • |
|  | • |

*FIG. 4B*

VIRTUAL BLOCK DEVICE

CLAIM OF PRIORITY

This application is a continuation of U.S. patent application Ser. No. 12/414,538 filed Mar. 30, 2009, entitled SYSTEM AND METHOD FOR DATA DEDUPLICATION by John Edward Gerard Matze.

BACKGROUND

1. Technical Field

The present invention relates to systems and methods for deduplicating data in electronic systems.

2. Related Art

Disks provide an easy, fast, and convenient way for backing up datacenters. As additional backups are made, including full, incremental, and differential backups, additional disks and disk space are required. However, disks add costs to any backup solution including the costs of the disks themselves, costs associated with powering and cooling the disks, and costs associated with physically storing the disks in the datacenter.

Thus, it becomes desirable to maximize the usage of disk storage available on each disk. One method of maximizing storage on a disk is to use some form of data compression. Software-based compression can be slow and processor-intensive, therefore hardware-accelerated compression came to be used. However, using data compression can achieve a nominal compression ratio of 2:1, which only slows the need to add additional disk storage.

Data deduplication provides another method of capacity optimization which can reduce the storage capacity required for a given amount of data. This in turn can reduce acquisition, power, heating, and cooling costs. Additionally, management costs can be reduced by reducing the number of physical disks required for data backup.

Data deduplication can be performed in-line or in post-processing. In-line data deduplication is performed in real time, as the data is being written. Post-processing occurs after data has been written to a non-deduplicating disk but before the data is committed to a permanent medium. Post-processing requires the full backup to be stored temporarily, thus defeating the storage benefits of deduplication.

SUMMARY

In one embodiment, a system for deduplicating data comprises a card operable to receive at least one data block and a processor on the card that generates a hash for each data block. The system further comprises a first module that determines a processing status for the hash and a second module that discards duplicate hashes and their data blocks and writes unique hashes and their data blocks to a computer readable medium. In one embodiment, the processor also compresses each data block using a compression algorithm.

BRIEF DESCRIPTION OF THE DRAWINGS

Further details of the present invention are explained with the help of the attached drawings in which:

FIG. 3 shows a method for data deduplication in accordance with an embodiment.

FIG. 4 shows a second method for data deduplication in accordance with an embodiment.

DETAILED DESCRIPTION

Data deduplication is a technique that can be used to minimize the amount of storage required for a given amount of data by eliminating redundant or duplicate data patterns within the given amount of data. Unique patterns of data can each be associated with a "fingerprint," calculated based on each pattern of data. Each fingerprint identifies a unique data pattern and can be used to identify and discard duplicate data patterns. Because only unique data is stored, the total required disk space is reduced.

Identifying and assigning a fingerprint to a data pattern may often be accomplished using a cryptographic hash function. The cryptographic hash function can receive a data pattern and produce a unique fingerprint based on the data pattern. Like data compression, hash processing can also be processor intensive. For example, in-line software deduplication (i.e., where deduplication is performed in real time) can accept data streams in the 10s of megabytes per second in stark contrast to non-deduplicating methods that can accept data streams in the 100s of megabytes per second. Therefore it can be beneficial to off-load hash processing to dedicated hardware. This can accelerate hash processing and relieve processing strain on general purpose processors.

In one embodiment, a method for deduplication comprises receiving a block of data. The block of data may be received from a file system. The method further comprises generating a hash value for the block of data. The hash value may be generated using a number of different algorithms. The method also comprises determining if the hash value is unique. This can be accomplished by comparing the hash value for the block of data with hash values for other blocks of data that have already been processed and written to disk. The method additionally comprises discarding the hash value and the block of data if the hash value is not unique and writing the block of data to a disk if the hash value is unique. Furthermore, data compression services may be used in conjunction with data deduplication to further minimize the required storage space for a given dataset. In one embodiment, if the hash value is unique the data block is compressed before it is written to the disk.

Figure 1:
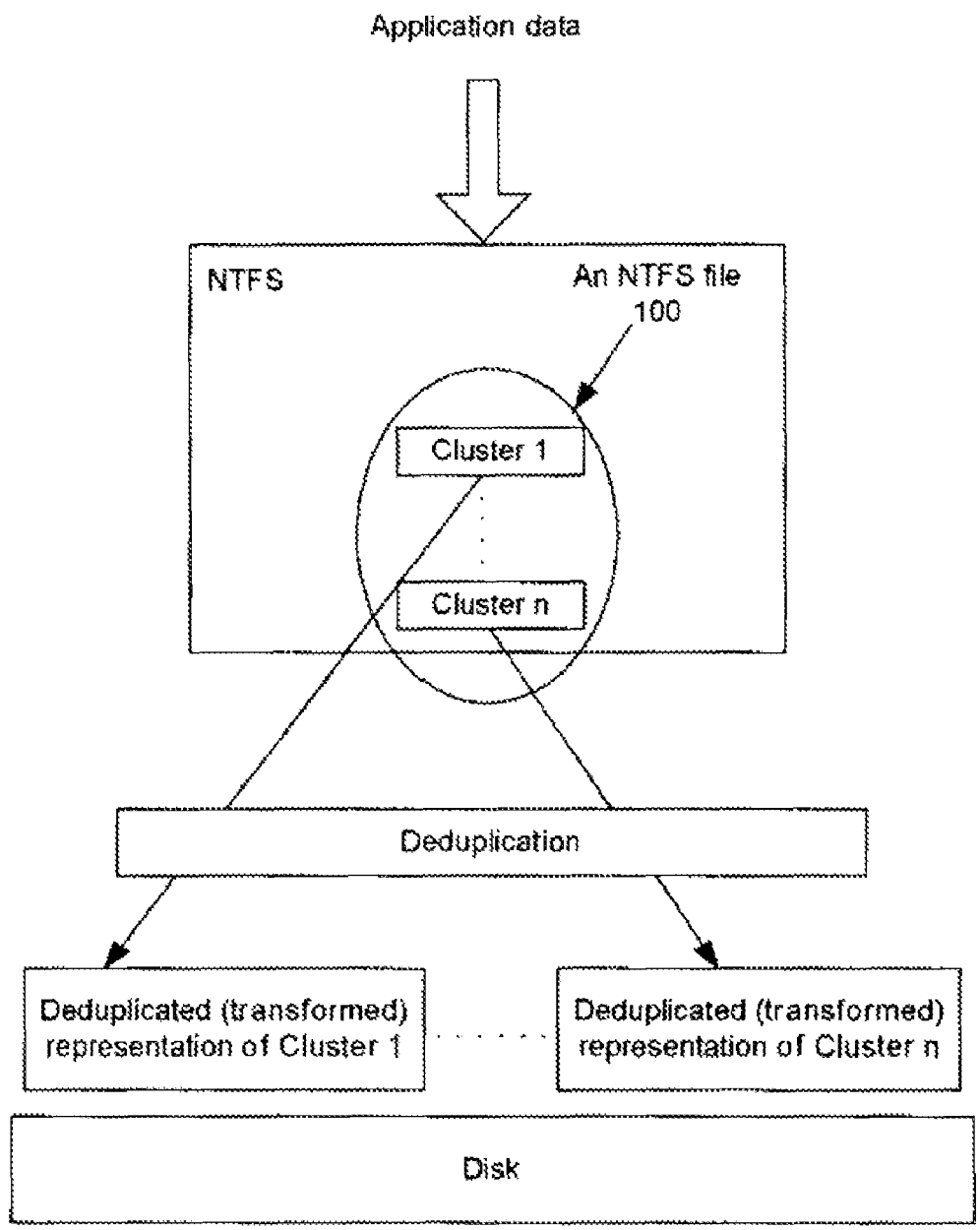
FIG. 1 shows a diagram of block level deduplication in accordance with an embodiment.

In one embodiment, data deduplication can be performed at the file or at the block (sub-file) level. File level deduplication, also called Single Instance Stores (SIS), eliminates identical files within or across systems. File level deduplication, however, requires the files to be identical to be deduplicated. FIG. 1 shows a diagram of block level deduplication in accordance with an embodiment. When application data is received at the file system it is broken up into clusters or blocks before being written to disk. In FIG. 1, NTFS file 100 comprises one or more clusters as shown by clusters 1 through n. Using file level deduplication, NTFS file 100 would be compared with other files in the system. If it were found to be identical to another file already stored on the system it would be discarded. Using block level deduplication, each cluster (or block) that comprises the file may be deduplicated. For example, two presentation files that have identical content but have different title pages will not be deduplicated at the file level. When data deduplication is performed at the block or sub-file level, the data blocks that comprise each file are deduplicated. Deduplication at the block level may be used to discard the duplicate blocks and store those blocks that are different (e.g., the blocks corresponding to the title pages).

In one embodiment, a system for deduplicating data may comprise a dedicated hardware card operable to receive at least one data block. A processor on the card may generate a hash for each data block. The system may also comprise a first module that determines a processing status for the hash. The processing status may indicate whether the data block associated with the hash is unique. Additionally, a second module may discard duplicate hashes and their data blocks and write unique hashes and their data blocks to a computer readable medium. In one embodiment, the dedicated hardware card may include a processor that is also operable to compress each data block using a compression algorithm.

Figure 2:
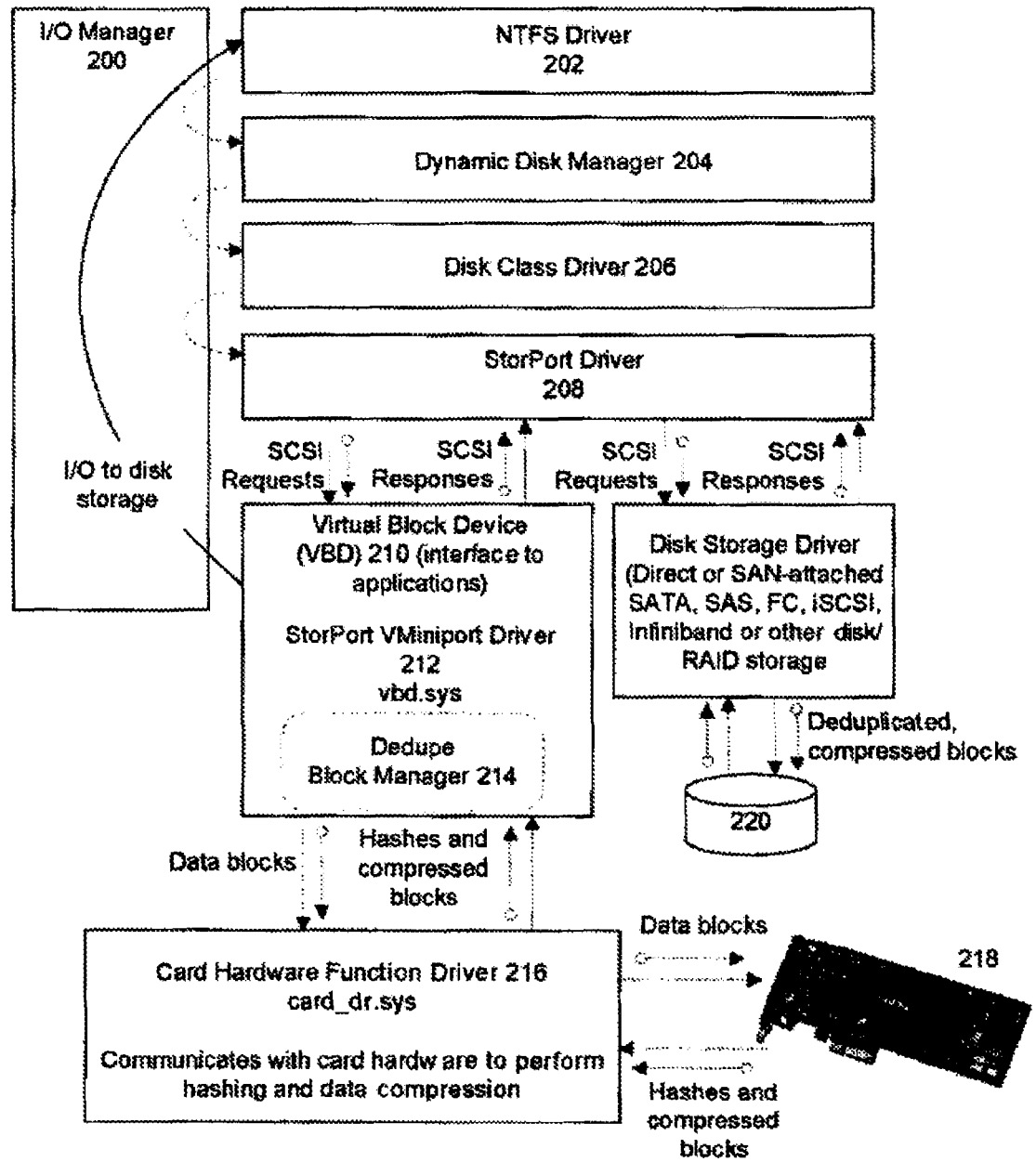
FIG. 2 shows a system for data deduplication in accordance with an embodiment.

FIG. 2 shows a system for data deduplication in accordance with an embodiment. In FIG. 2, the system includes a file system comprising an I/O Manager 200, NT File System (NTFS) driver 202, Dynamic Disk Manager 204, Disk Class Driver 206, and StorPort Driver 208. The system further includes one or more Virtual Block Devices (VBD) 210 which provide an application interface to capacity optimization services. In one embodiment, the capacity optimization services include data deduplication services. In other embodiments, the capacity optimization services may further include adaptive data compression, thin provisioning, and capacity monitoring services. Applications interact with each VBD as they would any other standard volume (for example, a VBD may be represented as a D: drive, or other typical volume label).

Each VBD can be configured to use different deduplication block sizes. For example, the deduplication block size may be set at 4 k, 8 k, 16 k, or 32 k. If the block size is set at 4 k, then a file will be broken into however many 4 k sized blocks are necessary to contain the file. These blocks will then be deduplicated. Block size may be configured to provide improved performance for different applications having different performance requirements. In one embodiment, each VBD is created by the StorPort VMiniport Driver 212 which can manage up to 16 different VBDs. The StorPort driver 208 is further operable to divert data to the deduplication services and filter the data using fingerprints created by the deduplication services.

FIG. 2 further includes a Dedupe Block Manager (DBM) 214. The DBM provides an interface with hardware capacity optimization services which can include deduplication and compression services. During a write operation, the DBM passes blocks of data to a processor on card 218 via Card Driver 216. The processor generates a fingerprint, also called a hash, for each block of data and returns the hash to the DBM. In one embodiment, the card compresses the data blocks and returns a compressed block along with its corresponding hash to the DBM. The DBM can then use each hash value to determine whether a data block is unique, and therefore should be written to disk 220, or whether the data block is a duplicate and should be discarded. In one embodiment, the card 218 can be the Hifn DR255 Card available from Hifn Inc., of Los Gatos, Calif.

In one embodiment, the hash is generated using a Secure Hash Algorithm (SHA-1). SHA-1 is specified in the Secure Hash Standard developed by the National Institute for Science and Technology and published in 1994. SHA-1 produces a 160-bit fingerprint (hash). It is possible for hash functions to generate the same hash for two different data patterns. When the same hash is assigned to different data patterns, this is called a hash collision. Hash collisions can lead to data corruption. It is therefore beneficial to use an algorithm that makes hash collisions very unlikely. SHA-1's 160-bit hash has a probability of randomly generating the same hash for different patterns of approximately 1 in $10^{24}$. This is significantly less likely than many disk errors. For example, the probability of an unrecoverable read error on a typical disk is approximately 1 in $10^{14}$.

FIG. 3 shows a method of data deduplication in accordance with an embodiment. At step 300, a block of data is sent by the DBM to the processor on the card. At step 302, the processor generates a hash for the block of data. In one embodiment, the hash is a 160-bit hash generated using the SHA-1 algorithm. The processor then returns the hash to the DBM. At step 304, the DBM generates a truncated hash based on the full hash. The truncated hash is used to perform a very fast lookup in an array stored in memory or on a solid-state drive (SSD). The array includes an index of all possible truncated hash values. The size of the array will depend based on the length of the truncated hash. Each entry in the array is initially set to a default value. In one embodiment, as shown in FIG. 3, the default value can be −1. As hashes are processed, entries in the array are updated to include a pointer to the full hash value corresponding to the truncated hash and the data block.

At step 306, the truncated hash is looked up in the array. At step 308, the corresponding entry is shown to be −1, the default value. The default value indicates that the datablock is not currently stored. This can be because either this truncated hash has not been processed and the data block is unique or the data block was previously processed and then deleted along with its associated hash. At step 310, an appropriately sized Extent and Sub-block allocation is found for the full hash and the data block. At step 312, the data block is written to disk and the array is updated with an appropriate pointer.

FIG. 4 shows a second method of data deduplication in accordance with an embodiment. Steps 400-406 proceed as in FIG. 3. At step 408, the truncated hash is found to have been previously processed. The corresponding entry is shown to be a pointer to the address of the full hash and data block. This indicates that the truncated hash value has been previously processed. At step 410, the full hash is retrieved from the metadata as indicated in the pointer. If the full hash values match, then the data block has been previously processed. The data block is discarded and a metadata counter is incremented. At step 412, if the full hash values do not match then it is determined whether there is a pointer to a second metadata location including a second full hash and data block corresponding to the truncated hash. Each previously processed full hash corresponding to the truncated hash is checked against the full hash. If no match is found, then a new metadata location is calculated for the hash and data block and they are written to disk. Additionally, a pointer to the new metadata location is added to the last hash checked. If a match is found, then the data is discarded and the metadata counter is incremented.

Using a truncated hash array is more efficient than checking each full hash as only a fraction of hashes require a full check. The length of the truncated hashes can be varied based on performance. If too many truncated hash collisions occur, the length of the truncated hash can be extended.

Figure 5:
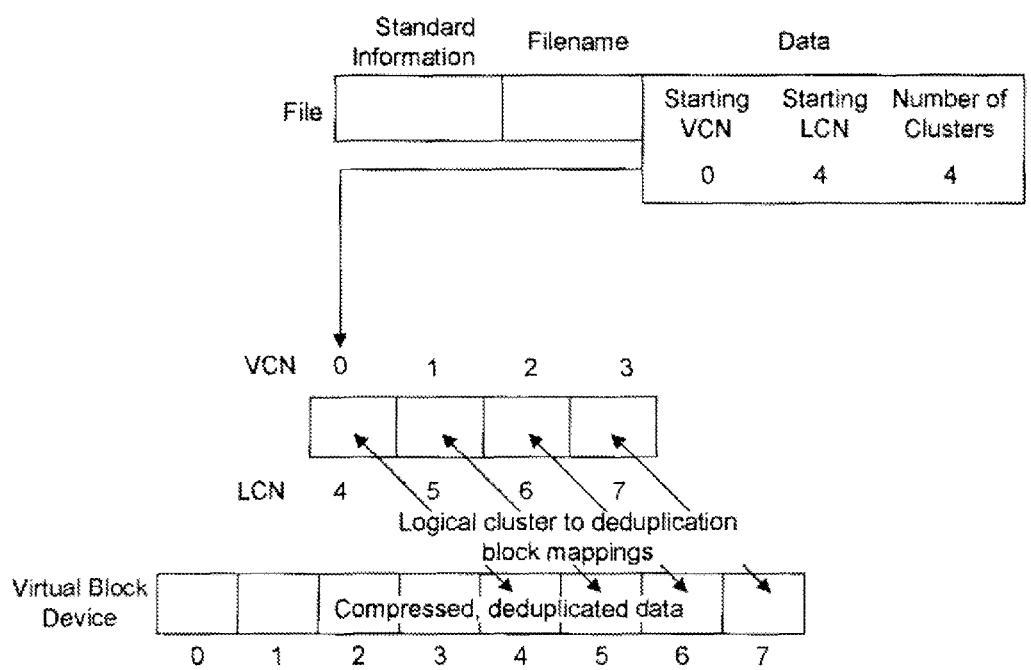
FIG. 5 shows a file to block mapping in accordance with an embodiment.

In one embodiment, data deduplication can be performed at the block level. File systems, such as NTFS, operate at the file level. Accordingly, mappings must be used between files in the file system and blocks used for deduplication. FIG. 5 shows a file to block mapping in accordance with an embodiment. NTFS allocates disk space using clusters. Cluster size is set during formatting and can range from 4 kilobytes to 64 kilobytes. There are two types of clusters in NTFS: Logical Clusters and Virtual Clusters. Logical clusters are referred to by their Logical Cluster Number (LCN). The LCNs are directly mapped to a physical disk address or RAID logical address by multiplying the cluster size of the partition by a sequential LCN. Virtual clusters are referred to by their Virtual Cluster Number (VCN). Files are mapped to LCNs by VCNs using a series of sequential numbers incremented for as many clusters as are needed to contain the file. As shown in FIG. 4, in one embodiment, each LCN is then mapped to addresses in the Virtual Block Device.

Block alignment can impact both capacity optimization and performance. In one embodiment, deduplication compares blocks that start on fixed boundaries against other blocks which start on fixed boundaries. If the blocks are not properly aligned on fixed boundaries, the effectiveness of the deduplication services can be negatively affected. In one embodiment, the block size used for deduplication is chosen to match the cluster or block size of the system it is associated with to minimize block misalignment. Some backup software creates output datasets that are not aligned at fixed boundaries. In embodiments designed for use with such datasets, an additional software layer is used to realign the data blocks from the backup format before deduplication.

Figure 6:
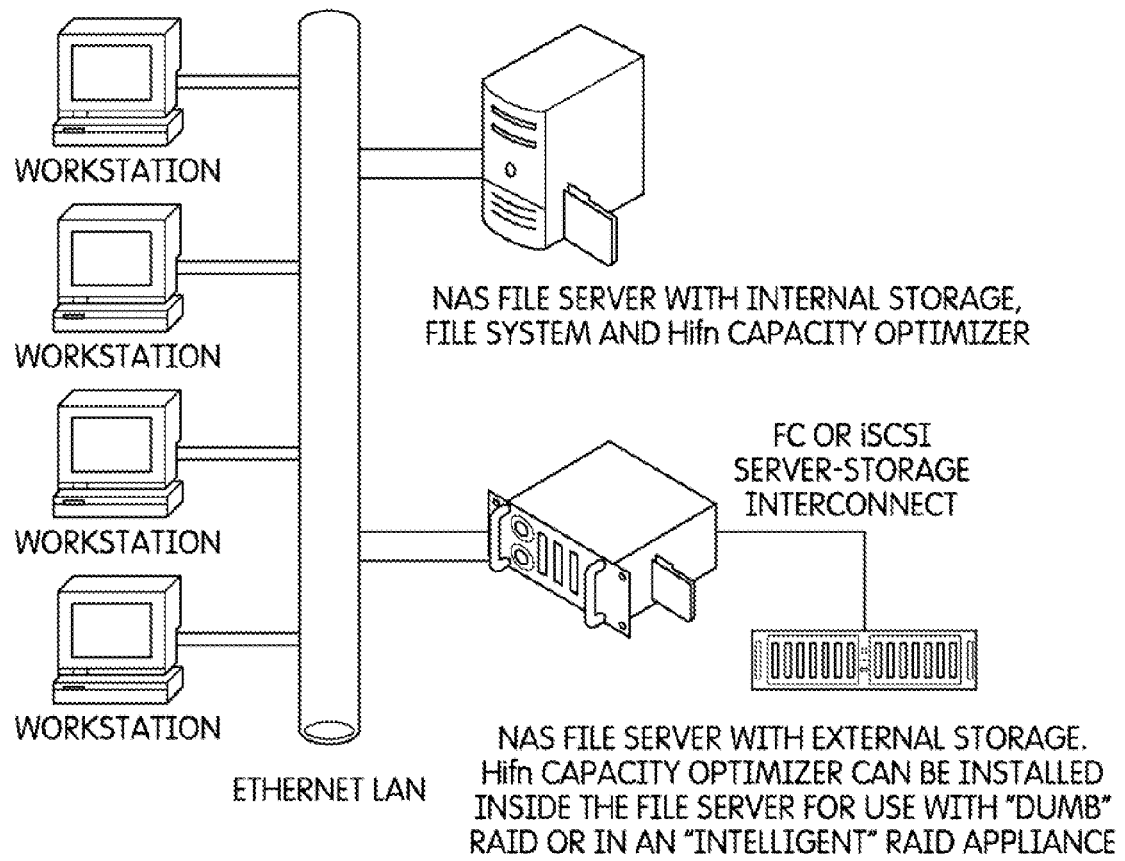
FIG. 6 shows a networked storage example in accordance with an embodiment.

Deduplication services can be added to a system at a number of different points, depending on network configuration and the needs of the user. FIG. 6 shows a networked storage example in accordance with an embodiment. Network Attached Storage (NAS) servers provide data storage services to other devices attached to the network. NAS servers can be used in a variety of networks including home networks, small office/home office (SOHO) networks, and business networks. In FIG. 5, two NAS servers are attached to a network and provide shared data storage to several workstations, connected to the network. Here, deduplication services are added to the file servers to offer capacity savings for the entire network. In one embodiment, deduplication services may be used with Microsoft SharePoint, available from Microsoft Corporation of Redmond, Wash.

Figure 7:
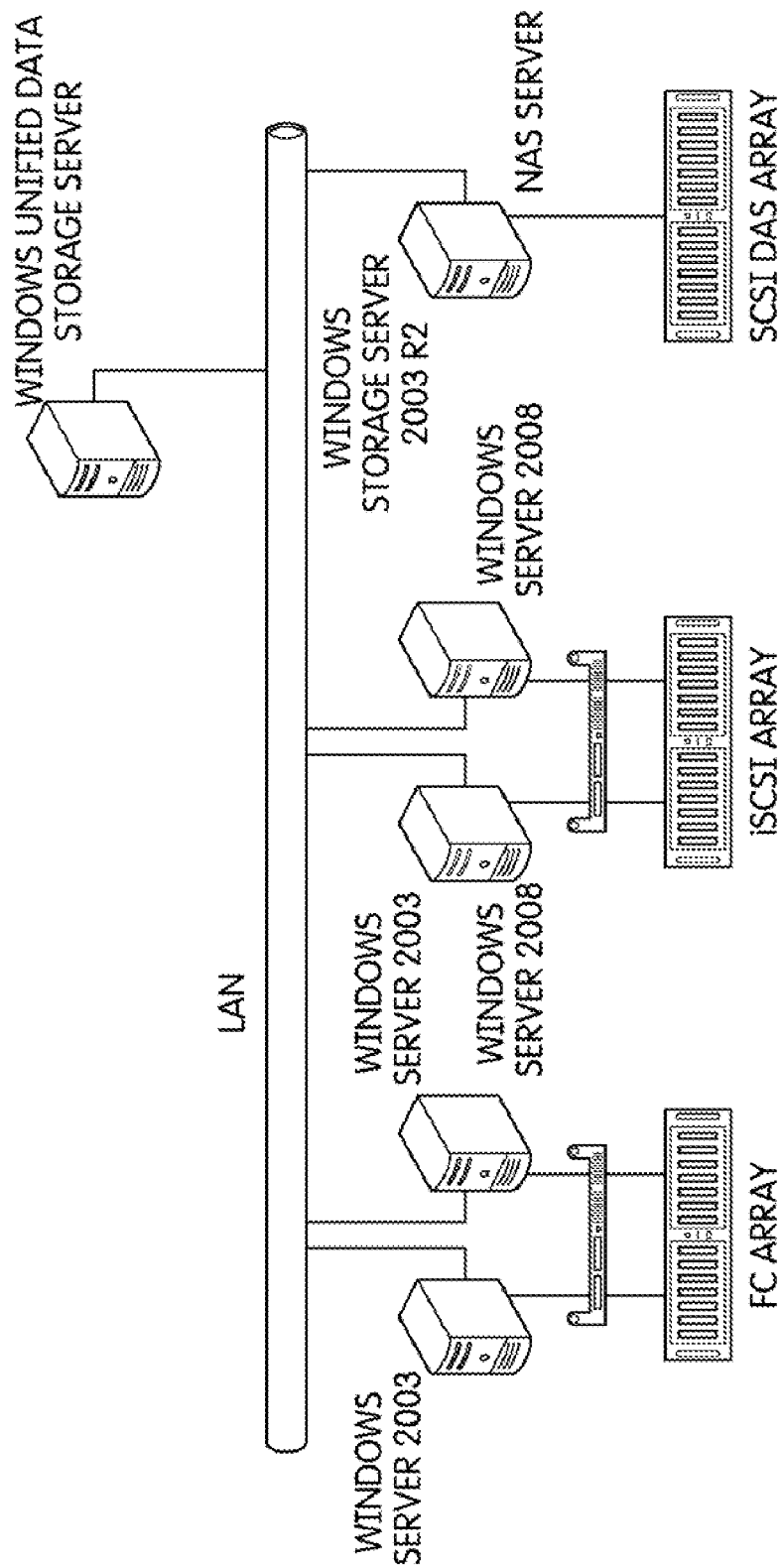
FIG. 7 shows potential deduplication deployment points in accordance with an embodiment.

FIG. 7 shows potential deduplication deployment points in accordance with an embodiment. Depending on network configuration details, deduplication services can be added at a variety of points in a network. FIG. 6 shows some of these points. These points include the FC array, iSCSI array, SCSI DAS array, or Windows Unified Data Storage Server (WUDSS).

In one embodiment, data compression services are provided in addition to data deduplication services. Data compression looks for repetitive data sequences in a data stream. Different data compression algorithms can be used as are known in the art. Adaptive data compression techniques that adapt dynamically to different types of data being compressed can also be used. In one embodiment, the data compression algorithm used is a variant of the Lempel-Ziv compression algorithm called eLZS.

In one embodiment, thin provisioning may be used in conjunction with data deduplication and/or data compression to increase efficiency and cost-effectiveness. Thin provisioning enables storage managers to allocate volumes of any size to servers without physically installing the storage. Thus, additional capacity can be added "just in time," preventing storage from being acquired and idled.

In one embodiment, a physical capacity monitor is used to determine the utilization of physical storage devices underlying the capacity optimization services, including data compression, data deduplication, and thin provisioning. Capacity optimization services reduce, but do not eliminate, the need for additional storage capacity. The physical capacity monitor can notify the user that additional storage capacity is required.

In one embodiment, a user or system administrator may configure the capacity optimization services using a graphical user interface (GUI). Alerts may be configured using the GUI to notify users via email. The alerts may include informational, warning, or error messages.

In one embodiment, capacity optimization services may be applied generally to any application data. However, many backup implementations are application-specific and therefore include primarily data of a single type from a specific application. Therefore, it is of note, that capacity optimization services are not uniformly effective across many data types. For example, video files, such as .avi and .wmv, may experience very high data reduction when stored on a system featuring capacity optimization services. However, some data, such as video surveillance data may not lend itself to capacity optimization services at all. Video surveillance data is often compressed at the camera, limiting the effectiveness of additional compression. Additionally, time stamp information is generally added to each frame of the video surveillance data, limiting the effectiveness of data deduplication, even at the block level.

Although the present invention has been described above with particularity, this was merely to teach one of ordinary skill in the art how to make and use the invention. Many modifications will fall within the scope of the invention, as that scope is defined by the following claims.

The invention claimed is:

1. A virtual block device that is an interface with applications, the virtual block device appearing to the applications as a memory device, wherein the virtual block device interacts with additional elements to do data deduplication to files at the block level such that one or more files accessed using the virtual block device have at least one block which is shared by the one or more files, and wherein the virtual block device is implemented using at least one processor.

2. The virtual block device of claim 1, wherein the at least one block is shared by at least two different files.

3. The virtual block device of claim 1, wherein the virtual block device appears to applications as a standard block device.

4. The virtual block device of claim 1, wherein the virtual block device is operable to set a block size for deduplication.

5. A system including the virtual block device of claim 1, further comprising additional virtual block devices and a driver that manages the virtual block device and the additional virtual block devices.

6. A system including the virtual block device of claim 1, wherein the additional elements do the functions of generating a hash value for a block of data, determining if the hash value is unique, discarding the hash value and the block of data if the hash value is not unique;

and writing the block of data to a disk if the hash value is unique.

7. The system of claim 6, further comprising updating a metadata counter for the hash value.

8. A system including the virtual block device of claim 1, wherein the additional elements include a unit to perform hashing operations and compression.

9. The system of claim 8, wherein the unit is a card to perform hardware-assisted compression.

10. The system of claim 8, wherein the additional elements include a deduplication block manager that passes blocks to the unit and receives a hash for each block from the unit.

11. The system of claim 10, wherein the deduplication block manager receives at least some compressed blocks from the unit.

12. The system of claim 11, wherein the additional elements include a truncated hash array that includes an index for each possible truncated hash value and a corresponding entry initially set to a default value wherein when a new hash is processed, the corresponding entry is modified to include a pointer to the new hash and block.

13. The system of claim 12,
wherein the unit
receives blocks from the deduplication block manager,
creates a hash value for each block of data using a hashing algorithm, and
compresses at least some blocks of data using a compression algorithm; and
wherein the deduplication block manager
receives the hash values and the at least some compressed blocks of data from the unit, and
creates a truncated hash corresponding to each hash value.

14. The system of claim 13, further comprising:
wherein the deduplication block manager looks up each truncated hash in the truncated hash array; and
wherein if the corresponding entry to the truncated hash is the default value then the virtual block device writes the block to a computer readable medium and adds a pointer to the block and hash value to the truncated hash array.

15. The system of claim 13, further comprising:
wherein the deduplication block manager looks up each truncated hash in the truncated hash array; and
wherein if the corresponding entry to the truncated hash includes a pointer to a processed hash value and block then the deduplication block manager retrieves the processed hash value and checks whether the hash value corresponding to the truncated hash matches the processed hash value.

16. The system of claim 15, wherein if the hash value matches the processed hash value then the block is discarded.

17. The system of claim 15, wherein if the hash value does not match the processed hash value then the deduplication block manager determines if there are pointers to additional processed hash values and the additional processed hash values are compared with the hash value.

18. The system of claim 17, wherein if the hash value does not match any processed hash values then the virtual block device writes the block to a computer readable medium and adds a pointer to the block and hash value to the truncated hash array.

19. A non-transitory computer readable medium including a virtual block device that is an interface with applications, the virtual block device appearing to the applications as a memory device, wherein the virtual block device interacts with additional elements to do data deduplication to files at the block level such that one or more files accessed using the virtual block device have at least one block which is shared by the one or more files.

20. The non-transitory computer readable medium of claim 19, wherein the at least one block is shared by at least two different files.

21. The non-transitory computer readable medium of claim 19, wherein the virtual block device appears to applications as a standard block device.

22. The non-transitory computer readable medium of claim 19, wherein the virtual block device is operable to set a block size for deduplication.

23. The non-transitory computer readable medium of claim 19, further comprising additional virtual block devices and a driver that manages the virtual block device and the additional virtual block devices.

* * * * *